(12) United States Patent
Miyairi et al.

(10) Patent No.: US 12,065,957 B2
(45) Date of Patent: Aug. 20, 2024

(54) CYLINDRICAL CAN BODY AND INDUCTION HEATING CATALYST DEVICE

(71) Applicant: NGK Insulators, Ltd., Nagoya (JP)

(72) Inventors: Yukio Miyairi, Nagoya (JP); Masaaki Masuda, Nagoya (JP); Shuichi Ichikawa, Nagoya (JP); Takuya Ishihara, Tsushima (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/165,435

(22) Filed: Feb. 7, 2023

(65) Prior Publication Data

US 2023/0184151 A1    Jun. 15, 2023

Related U.S. Application Data

(63) Continuation of application No. PCT/JP2021/019857, filed on May 25, 2021.

(30) Foreign Application Priority Data

Nov. 4, 2020    (JP) ................................ 2020-184568

(51) Int. Cl.
*F01N 3/20* (2006.01)
*F01N 3/28* (2006.01)

(52) U.S. Cl.
CPC ......... *F01N 3/2013* (2013.01); *F01N 3/2828* (2013.01); *F01N 2240/05* (2013.01); *F01N 2240/16* (2013.01); *F01N 2330/30* (2013.01)

(58) Field of Classification Search
CPC .. F01N 3/2013; F01N 3/2828; F01N 2240/05; F01N 2240/16; F01N 2330/30;
(Continued)

(56) References Cited

U.S. PATENT DOCUMENTS

| 9,488,085 | B2 | 11/2016 | Crawford et al. |
| 2017/0022868 | A1 | 1/2017 | Crawford et al. |

(Continued)

FOREIGN PATENT DOCUMENTS

| JP | H08-028250 A | 1/1996 |
| JP | H08-074563 A | 3/1996 |
| JP | 2019-163760 A | 9/2019 |

OTHER PUBLICATIONS

English translation of the International Preliminary Report on Patentability (Chapter I) dated May 19, 2023 (Application No. PCT/JP2021/019857).

(Continued)

*Primary Examiner* — Brandon D Lee
(74) *Attorney, Agent, or Firm* — BURR PATENT LAW, PLLC

(57) ABSTRACT

A cylindrical can body capable of housing a honeycomb structure therein, the cylindrical can body including: a coil for induction-heating the honeycomb structure; a cylindrical member made of an insulating material; and a cylindrical metal member capable of housing the coil and the cylindrical member therein, wherein, in a cross section parallel to an axial direction of the cylindrical member, (i) the coil is provided radially outward from an inner circumferential surface of the cylindrical member, and at least a part of the coil is embedded in the cross section of the cylindrical member; or (ii) the coil is provided on an outer circumferential portion of the cylindrical member.

9 Claims, 11 Drawing Sheets

(58) Field of Classification Search
CPC .... F01N 2330/34; F01N 3/10; F01N 2330/06; B01D 53/94; H05B 6/10
See application file for complete search history.

(56) References Cited

U.S. PATENT DOCUMENTS

| | | | | |
|---|---|---|---|---|
| 2018/0353892 | A1* | 12/2018 | Bookbinder | B01D 46/24494 |
| 2019/0070596 | A1* | 3/2019 | Yang | B01J 23/83 |
| 2019/0218949 | A1* | 7/2019 | Crawford | H05B 6/365 |
| 2019/0297683 | A1 | 9/2019 | Takahashi et al. | |
| 2019/0299202 | A1* | 10/2019 | Ikoma | B01J 35/04 |
| 2019/0338688 | A1* | 11/2019 | Crawford | F01N 3/0222 |

OTHER PUBLICATIONS

International Search Report and Written Opinion (Application No. PCT/JP2021/019857) dated Aug. 17, 2021.

* cited by examiner

CYLINDRICAL CAN BODY AND INDUCTION HEATING CATALYST DEVICE

FIELD OF THE INVENTION

The present invention relates to a cylindrical can body and an induction heating catalyst device.

BACKGROUND OF THE INVENTION

Exhaust gases from motor vehicles may typically contain harmful components such as carbon monoxide, hydrocarbons and nitrogen oxides and/or fine particles of carbon or the like as a result of incomplete combustion. These harmful components are discharged during a period immediately after an engine is started, i.e., a period during which a catalyst temperature is lower and a catalytic activity is insufficient. Therefore, the harmful components in the exhaust gas may be discharged without being purified by the catalyst before reaching a catalyst activating temperature. In order to satisfy such a need, it is necessary to reduce emission as much as possible, which is discharged without being purified by a catalyst before reaching the catalyst activating temperature. For example, measures using an electric heating technique are known in the art.

Patent Literature 1 discloses an invention relating to a catalytic converter in which a catalyst support having a metal wire inserted therein is provided inside a metal tube, and a coil is further arranged around the catalyst support. In the catalytic converter, an electric current is passed through the coil to subject the catalyst support to induction heating, thereby activating the catalyst and purifying an exhaust gas.

CITATION LIST

Patent Literature

[Patent Literature 1] U.S. Pat. No. 9,488,085 B2

SUMMARY OF THE INVENTION

In Patent Literature 1, the coil is arranged inside a metal tube together with the catalyst support. The arranging of the coil inside the metal tube in such a manner may complicate a structure of an electrical wiring that is connected to the coil in order to flow a current from an external power supply. Also, the insulation around the coil would be insufficient due to condensed water from the exhaust gas, and there would be a need for improvement.

The present invention has been made in view of the above circumstances. An object of the present invention is to provide a cylindrical can body and an induction heating catalyst device, which can improve insulation around a coil by simplifying a structure of an electric wiring that is connected to the coil for induction-heating a honeycomb structure.

The above problems are solved by the present invention as described below, and the present invention is specified as follows:

(1)
A cylindrical can body capable of housing a honeycomb structure therein, the cylindrical can body comprising:
  a coil for induction-heating the honeycomb structure;
  a cylindrical member made of an insulating material; and
  a cylindrical metal member capable of housing the coil and the cylindrical member therein,
  wherein, in a cross section parallel to an axial direction of the cylindrical member,
    (i) the coil is provided radially outward from an inner circumferential surface of the cylindrical member, and at least a part of the coil is embedded in the cross section of the cylindrical member; or
    (ii) the coil is provided on an outer circumferential portion of the cylindrical member.

(2)
A cylindrical can body capable of housing a honeycomb structure therein,
  wherein the cylindrical can body comprises a coil for induction-heating the honeycomb structure;
  wherein the cylindrical can body is made of an insulating material; and
  wherein, in a cross section parallel to an axial direction of the cylindrical can body,
    (i) the coil is provided radially outward from an inner circumferential surface of the cylindrical can body, and at least a part of the coil is embedded in the cross section of the cylindrical can body; or
    (ii) the coil is provided on an outer circumferential portion of the cylindrical can body.

(3)
An induction heating catalyst device comprising: the cylindrical can body according to (1) or (2); and a honeycomb structure having magnetic bodies housed inside the cylindrical can body via a buffering member.

According to the present invention, it is possible to provide a cylindrical can body and an induction heating catalyst device, which can improve insulation around a coil by simplifying a structure of an electric wiring that is connected to the coil for induction-heating a honeycomb structure.

DETAILED DESCRIPTION OF THE INVENTION

Hereinafter, embodiments of the present invention will be described with reference to the drawings. It should be understood that the present invention is not limited to the embodiments as described below, and various design changes, improvement and the like may be made based on knowledge of one of ordinary skill in the art, without departing from the scope of the present invention.

Embodiment 1

Figure 1A:
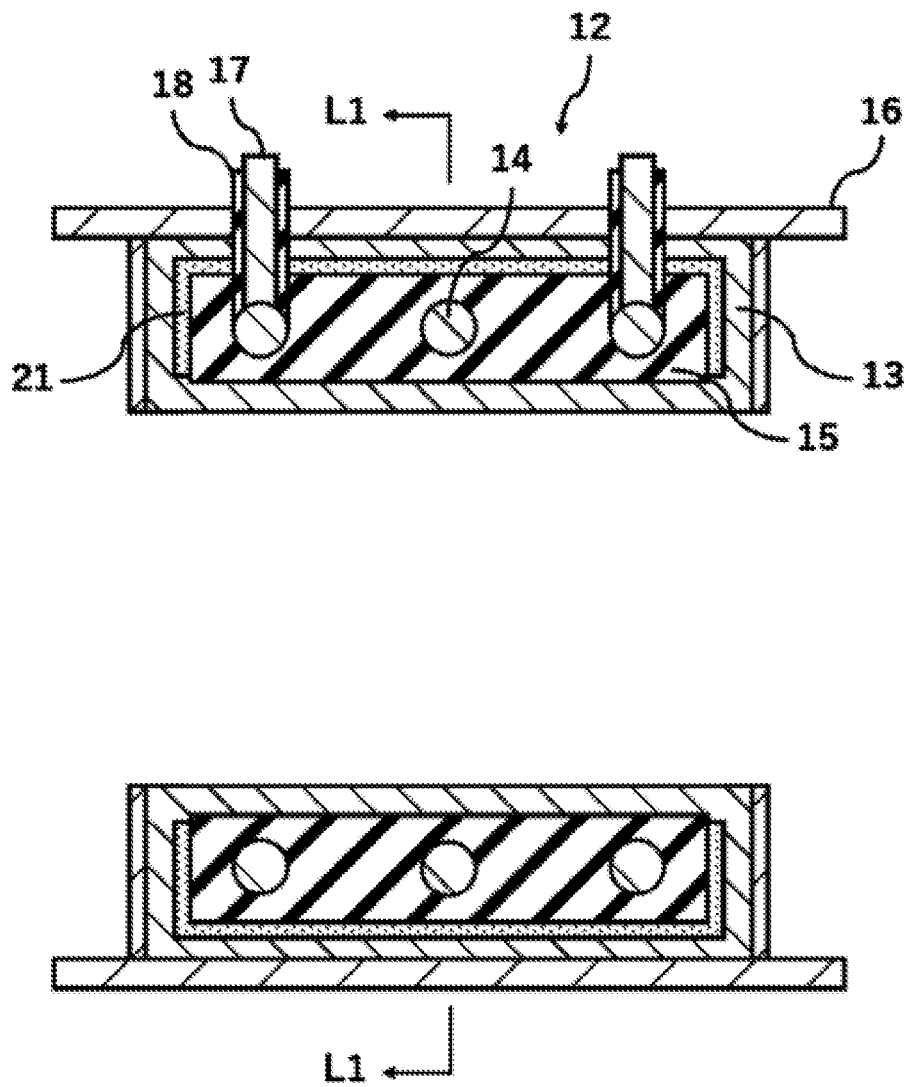
FIG. 1A is a schematic cross-sectional view of a cylindrical member of a cylindrical can body according to Embodiment 1 of the present invention, which is parallel to an axial direction.
Figure 1B:
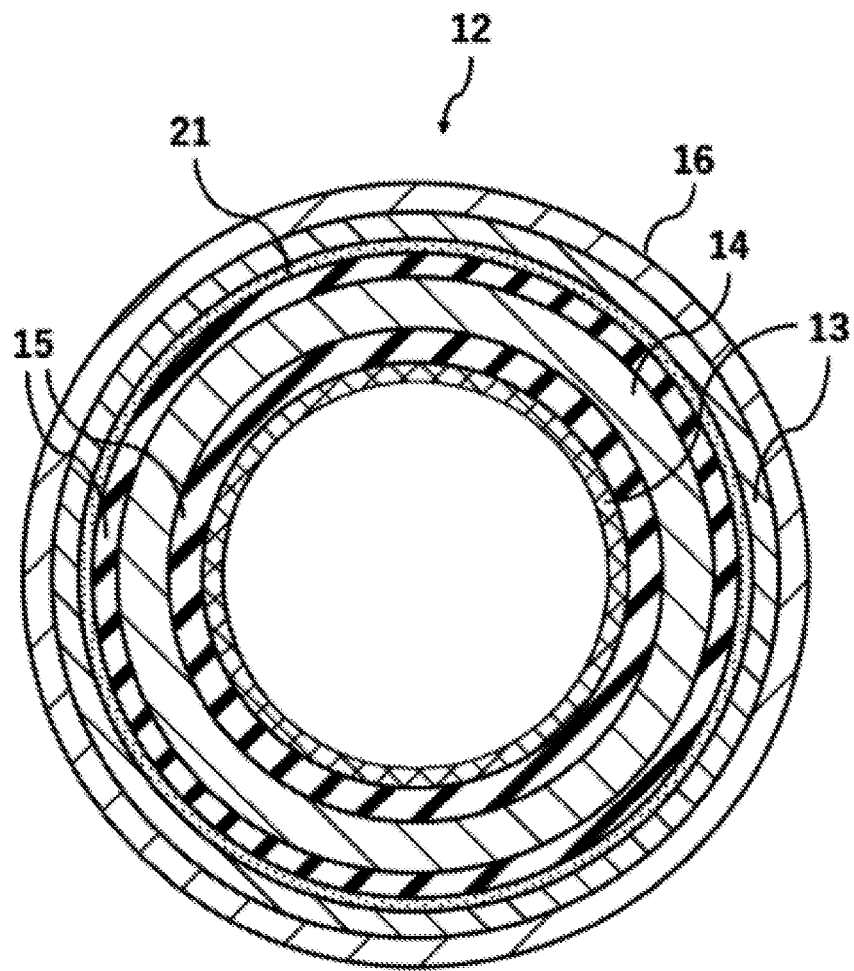
FIG. 1B is a schematic view of the L1-L1 cross section in FIG. 1A.

FIG. 1A is a schematic cross-sectional view of a cylindrical member 15 of a cylindrical can body 12 according to Embodiment 1 of the present invention, which is parallel to an axial direction. FIG. 1B is a schematic cross-sectional view of the L1-L1 cross section in FIG. 1A.

The cylindrical can body 12 includes: a coil 14 for induction-heating a honeycomb structure; a cylindrical member 15 made of an insulating material; and a cylindrical metal member 16 capable of housing the coil 14 and the cylindrical member 15 therein. The cylindrical can body 12 is configured to house the honeycomb structure therein, and it may or may not include the honeycomb structure as a component thereof.

The coil 14 for induction-heating the honeycomb structure is arranged so as to circulate along a circumferential surface of the cylindrical member 15, and is arranged so as to be able to surround the outer side of the honeycomb structure. The coil 14 can be formed using a material known as an IH coil. Specific examples of the material of the coil 14 include copper and the like. The cross section of the coil 14 may be substantially square, substantially rectangular, elliptical, circular, or the like, although not particularly limited thereto. Also, it may employ a so-called litz wire, which is a bundle of copper wires covered with an insulating film such as a polyamide-imide film.

Electric connection terminals 17 for connecting an electric wiring are connected to the coil 14. The electrical wiring is connected to an external power supply. Through the electrical wiring, a current flows to the coil 14 and the induction heating takes place. Each electrical connection terminal 17 is connected to the coil 14 by being inserted in the radial direction of the cylindrical can body 12 from the outside of the cylindrical metal member 16 through a through hole. The electrical connection terminals 17 are covered with an insulating material 18.

The coil 14 is provided radially outward from an inner circumferential surface of the cylindrical member 15 in a cross section parallel to the axial direction of the cylindrical member 15 made of an insulating material. Also, the coil 14 is embedded in the cross section of the cylindrical member 15 made of the insulating material. It should be noted that FIG. 1 shows such a structure in which the coil 14 is embedded in the cross section of the cylindrical member 15 made of the insulating material. In the present invention, the coil 14 is not limited to this structure, it may have a structure in which at least a part of the coil 14 is embedded in the cross section as long as the coil 14 is provided radially outward from the inner circumferential surface of the cylindrical member 15 in the cross section parallel to the axial direction of the cylindrical member 15. According to such a structure, the coil 14 is not exposed to the inner surface of the cylindrical member 15, so that the electrical wiring to be connected to the coil 14 for induction heating of the honeycomb structure can be simplified. Further, when the coil is arranged inside the metal tube as in the prior art, there is a problem that it is difficult to control a surface pressure of a canning mat (buffering member) on the honeycomb structure, and the force for holding the honeycomb structure during use cannot be maintained. In contrast, according to the embodiment of the present invention, the coil 14 is not exposed to the inner surface of the cylindrical member 15, so that it becomes easy to manage the surface pressure of the canning mat, and the force for holding the honeycomb structure during use can be easily maintained. Furthermore, according to the embodiment of the present invention, the coil 14 is not exposed to the inner surface of the cylindrical member 15, so that the coil 14 is prevented from being wet with condensed water from an exhaust gas during use, and the insulation around the coil 14 can be satisfactorily maintained.

The surface of the coil 14 may be covered with a buffering layer. According to such a structure, the coil 14 can be protected to suppress deterioration such as oxidation of the coil 14.

The insulating material forming the cylindrical member 15 can contain any one of silicon nitride, sialon, silicon carbide, cordierite, alumina, zirconia, silica and mullite as a main component, or contain a composite material thereof as a main component. As the insulating material, it is preferable to use an alumina fiber reinforced material or a mullite fiber reinforced material from the viewpoint of reliability against thermal stress fracture. As used herein, the "main component" means more than 50% by mass, preferably 80% by mass or more, more preferably 90% by mass or more, relative to the composition of the cylindrical member 15.

The thickness of the cylindrical member 15 is not particularly limited as long as it has a size that allows the coil 14 to be embedded therein. For example, it can be formed at a thickness of 5 to 40 mm, or at a thickness of 10 to 30 mm.

The cylindrical metal member 16 is formed so as to house the coil 14 and the cylindrical member 15 therein. The cylindrical metal member 16 can employ any known metal material. Examples include stainless steel, titanium alloys, copper alloys, aluminum alloys, and brass. Among them, stainless steel is preferable because of its high durability reliability and low cost.

Although the thickness of the cylindrical metal member 16 is not particularly limited, it may preferably be 0.5 mm or more, and more preferably 1 mm or more. The thickness of the cylindrical metal member 16 of 0.5 mm or more can ensure the durability. Moreover, the thickness of the cylindrical metal member 16 is preferably 5 mm or less, and more preferably 3 mm or less. The thickness of the cylindrical metal member 16 of 5 mm or less can reduce the weight.

The cylindrical can body 12 has an electromagnetic shielding layer 21 between the coil 14 and the cylindrical metal member 16 in the cross section parallel to the axial direction. In the embodiment shown in FIG. 1, the electromagnetic shielding layer 21 is provided so as to cover the outer side of the cylindrical member 15 in which the coil 14 is embedded. By providing the electromagnetic shielding layer 21 between the coil 14 and the cylindrical metal member 16, electromagnetic waves generated by the coil 14 during induction heating can be blocked within the electromagnetic shielding layer 21. The component of the electromagnetic shielding layer 21 is not particularly limited, and known materials such as ferrite, silicon iron, permendur, and electromagnetic stainless steel can be used. It should be noted that the electromagnetic shielding layer 21 may not be provided on the cylindrical can body 12. The shielding layer 21 preferably has a thickness of 0.3 to 10 mm, and more preferably 1 to 5 mm.

Between the electromagnetic shielding layer 21 covering the cylindrical member 15 and the cylindrical metal member 16 is a buffing member 13. Further, the cylindrical can body 12 is provided with the buffering member 13 so as to be arranged between the honeycomb structure and the cylindrical member 15 when the cylindrical can body houses the honeycomb structure therein. The buffer member 13 may employ any known material, and it may be made of, for example, ceramic fiber or glass fiber.

A method for producing the cylindrical can body 12 according to Embodiment 1 of the present invention and an induction heating catalyst device 10 including the same will be described below. The method for producing the cylindrical can body 12 according to Embodiment 1 of the present invention and the induction heating catalyst device 10 including the same includes a step of preparing a honeycomb structure having a magnetic body, which will be described later; a step of producing a cylindrical member having a coil embedded therein; and a step of housing the honeycomb structure in the cylindrical member via the buffering member 13.

In the step of producing the cylindrical member having the coil embedded therein, first, a coil made of copper or the like is prepared and provided so as to have a shape that surrounds an outer circumference of the honeycomb structure. The coil is then placed in a mold, and a slurry of an insulating material (a raw material for the cylindrical member) is poured into the mold and fired. The cylindrical member having the coil embedded therein is thus obtained. Further, the electromagnetic shielding layer is formed by providing a thin wall component prepared using ferrite or the like at a predetermined position on the outer circumference of the cylindrical member. Alternatively, the coil may be placed in the raw material powder without using the insulating material slurry, hydrostatically pressurized and then sintered to produce the cylindrical member. Hot press firing may be used as the firing method.

In the step of housing the honeycomb structure in the cylindrical member via the buffering member, first, the outer circumference of the honeycomb structure is covered with the buffering member, which is pushed into the cylindrical member and housed. The cylindrical member housing the honeycomb structure therein is connected to the cylindrical metal member. As for the connection, they may be press-fitted with the buffering material interposed therebetween, or they may be arranged so as to be fitted by a method such as shrink fitting, brazing, or diffusion bonding. The electrical connection terminals each covered with the insulating material are inserted from the outside of the cylindrical metal member in the radial direction of the cylindrical can body through previously formed through holes, and connected to the coil.

As described above, the cylindrical can body 12 according to Embodiment 1 of the present invention and the induction heating catalyst device 10 including the same are obtained.

Embodiment 2

Figure 2A:
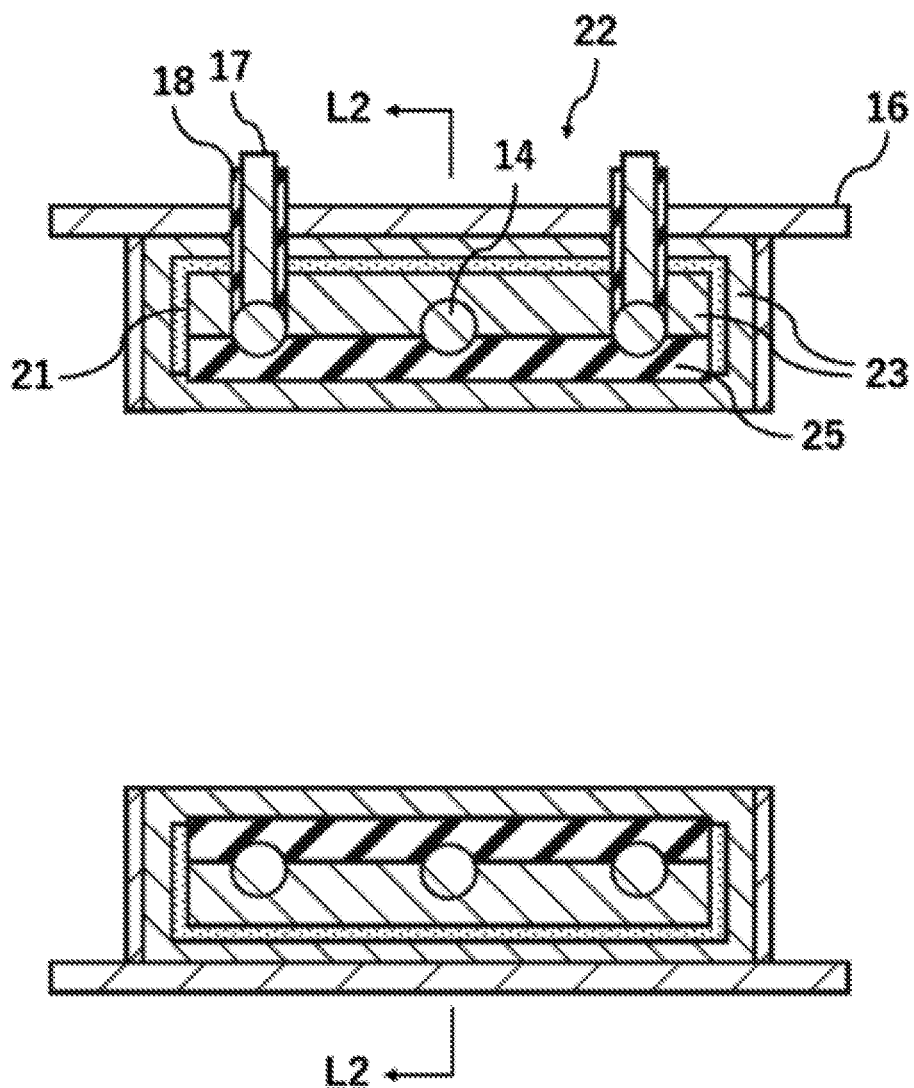
FIG. 2A is a schematic cross-sectional view of a cylindrical member of a cylindrical can body according to Embodiment 2 of the present invention, which is parallel to the axial direction.
Figure 2B:
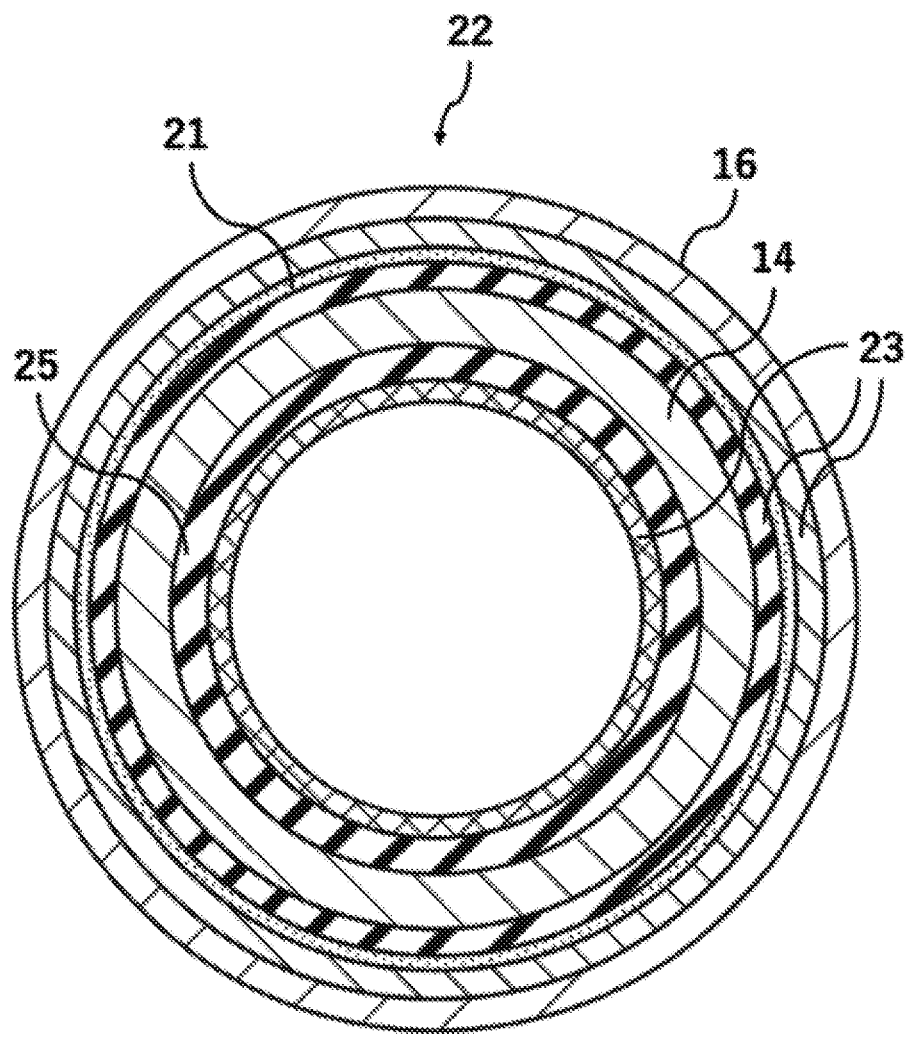
FIG. 2B is a schematic view of the L2-L2 cross section in FIG. 2A.

FIG. 2A is a schematic cross-sectional view of a cylindrical member 25 of a cylindrical can body 22 according to Embodiment 2 of the present invention, which is parallel to an axial direction. FIG. 2B is a schematic cross-sectional view of the L2-L2 cross section in FIG. 2A.

The cylindrical can body 22 according to Embodiment 2 is different from the cylindrical can body 12 according to Embodiment 1 in that the coil 14 is provided on the outer circumferential portion of the cylindrical member 25 instead of being embedded in the cross section of the cylindrical member 25. A buffering member 23 is provided between the outer side of the coil 14 and an electromagnetic shielding layer 21. Except for this, it has the same structure as that of the cylindrical can body 12 according to Embodiment 1, and can be provided with all the same component, arrangement, and the like, as described in Embodiment 1.

The coil 14 of the cylindrical can body 22 is provided on the outer circumferential portion of the cylindrical member 25. Here, as used herein, the phrase "the coil 14 is provided on the outer circumferential portion of the cylindrical member 25" indicates that the coil 14 is (1) in contact with the outer circumferential portion of the cylindrical member 25 and provided on an outer side of the cylindrical member 25; or has (2) a portion partially embedded in the cylindrical member 25 near the outer circumference of the cylindrical member 25, the other portion being provided on an outer side of the cylindrical member 25. The example of FIG. 2 shows the state (2) where a part of the coil 14 is embedded in the cylindrical member 25. According to such a structure, the coil 14 is not exposed to the inner surface of the cylindrical member 25, so that the electrical wiring to be connected to the coil 14 for induction heating of the honeycomb structure can be simplified. In addition, as with the embodiment shown in Embodiment 1, it becomes easy to manage the surface pressure of the canning mat, and the force for holding the honeycomb structure during use can be easily maintained. Further, the coil 14 is prevented from being wet with condensed water from an exhaust gas during use, and the insulation around the coil 14 can be satisfactorily maintained.

A method for producing the cylindrical can body 22 according to Embodiment 2 of the present invention and an induction heating catalyst device including the same will be described below. The method for producing the cylindrical can body 22 according to Embodiment 2 of the present invention and the induction heating catalyst device having the same includes a step of preparing a honeycomb structure having a magnetic body, which will be described later; a step of producing a cylindrical member having a coil provided on an outer circumferential portion; and a step of housing the honeycomb structure in the cylindrical member via a buffering member.

In the step of producing the cylindrical member having the coil provided on the outer circumferential portion, first, a coil made of copper or the like is prepared and provided so as to have a shape that surrounds an outer circumference of the honeycomb structure. The coil is then placed in a mold, and a slurry of an insulating material (a raw material for the cylindrical member) is poured into the mold and fired. Alternatively, the coil is placed in a metal mold, the raw material powder for the cylindrical member is filled and pressed to obtain a formed body, which is then sealed in a rubber bag or the like and subjected to hydrostatic pressure to obtain a dense formed body. The formed body is then fired. By these methods, the cylindrical member having the coil provided on the outer circumferential portion is obtained. Subsequently, a buffering member (ceramic fiber or glass fiber) is wound around the outer side of the cylindrical member having the coil provided on the outer circumferential portion, and a thin wall member made of a material such as ferrite is mechanically fixed to the outer side to form an electromagnetic shielding layer.

The step of housing the honeycomb structure in the cylindrical member via the buffering member can be performed in the same manner as the step of housing the honeycomb structure in the cylindrical member via the buffering member of Embodiment 1 as described above. The cylindrical member housing the honeycomb structure on the inner side and the cylindrical metal member are then connected to each other in the same manner as in Embodiment 1 as described above.

The cylindrical can body 22 according to Embodiment 2 of the present invention and the induction heating catalyst device including the same are thus obtained.

Embodiment 3

Figure 3A:
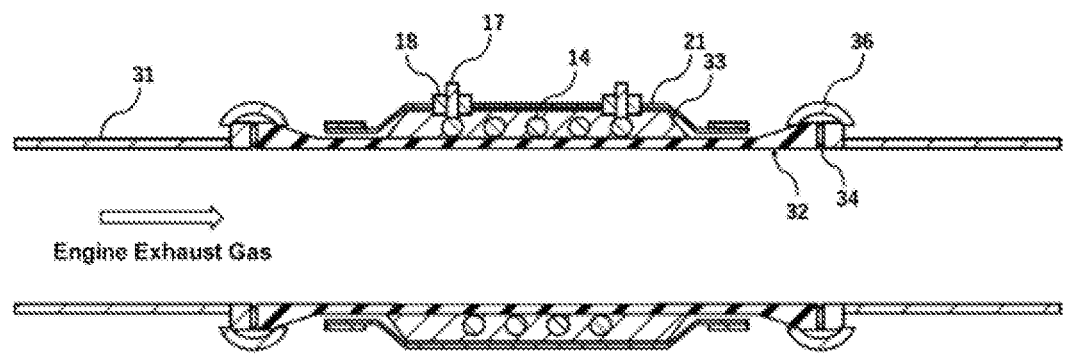
FIG. 3A is a schematic cross-sectional view of a cylindrical can body according to Embodiment 3 of the present invention, which is parallel to an axial direction.
Figure 3B:
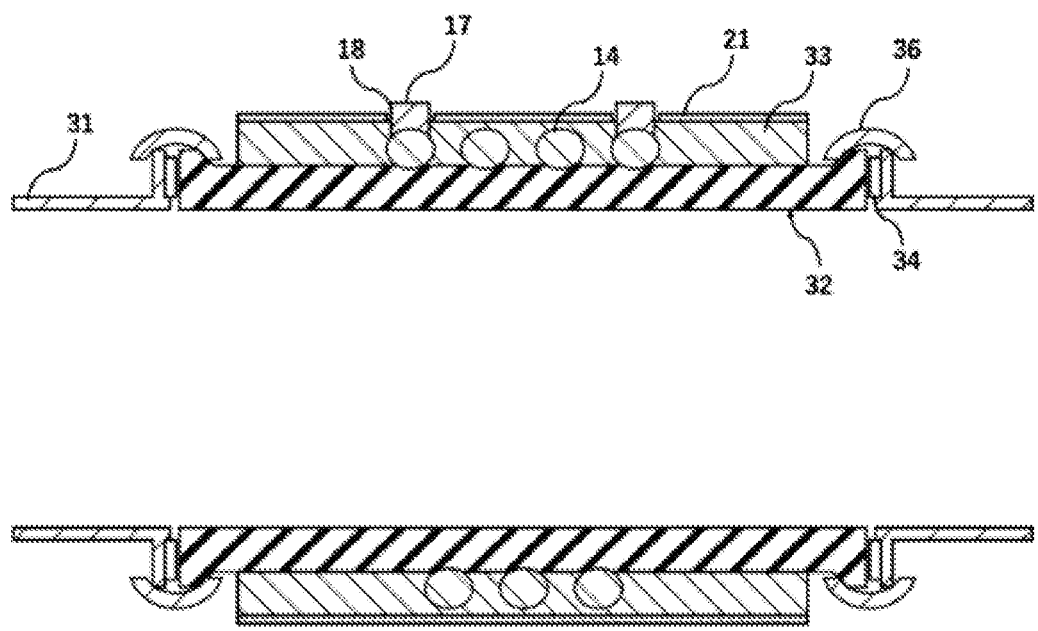
FIG. 3B is an enlarged schematic view of the cylindrical can body shown in FIG. 3A.

FIG. 3A is a schematic cross-sectional view of a cylindrical can body 32 according to Embodiment 3 of the present invention, which is parallel to an axial direction. FIG. 3B is an enlarged schematic view of the cylindrical can body 32 as shown in FIG. 3A. FIGS. 3A and 3B each shows a state where the cylindrical can body 32 is connected at its gas inlet side and gas outlet side to a metal exhaust pipe 31 which serves as a flow path for an exhaust gas from an engine. The metal exhaust pipe 31 is fixed by fixing members 36 via gaskets 34 at both ends of the cylindrical can body 32. In addition to the above methods, the metal exhaust pipe 31 and the cylindrical can body 32 may be fixed by bonding using an adhesive, joining using a mechanical assembly member, press fitting, shrink fitting, or the like.

The cylindrical can body 32 includes the coil 14 for induction heating of the honeycomb structure, and is made of an insulating material. In a cross section parallel to the axial direction of the cylindrical can body 32, the coil 14 is provided on the outer circumferential portion of the cylindrical can body 32. The embodiment where the coil 14 is provided on the outer circumferential portion of the cylindrical can body 32 is as described in Embodiment 2, so that the coil 14 is not exposed on an inner surface of the cylindrical can body 32 as with Embodiment 2. Therefore, it has effects that the structure of the electrical wiring to be connected to the coil 14 for induction heating of the honeycomb structure can be simplified, and the insulation around the coil can be improved, and the like.

The surface of the coil 14 of the cylindrical can body 32 may be held by a buffering material. According to such a structure, the coil 14 can be protected to suppress deterioration such as oxidation of the coil 14.

The cylindrical can body 32 has the electromagnetic shielding layer 21 located on an outer side than the coil 14 in a cross section parallel to the axial direction. According to such a structure, electromagnetic waves generated by the coil 14 during induction heating can be blocked by the electromagnetic shielding layer 21.

A method for producing the cylindrical can body 32 according to Embodiment 3 of the present invention and an induction heating catalyst device including the same will be described below. The method for producing the cylindrical can body 32 according to Embodiment 3 of the present invention and the induction heating catalyst device including the same includes a step of preparing a honeycomb structure having a magnetic body; a step of producing a cylindrical can body having a coil provided on an outer circumferential portion; and a step of housing the honeycomb structure in the cylindrical can body via the buffering member.

In the step of producing the cylindrical can body having the coil provided on the outer circumferential portion, first, a coil made of copper or the like is prepared and provided so as to have a shape that surrounds an outer circumference of the honeycomb structure. The coil is then placed in a mold, and a slurry of an insulating material (a raw material for the cylindrical can body) is poured into the mold and fired. Alternatively, the coil is placed in a metal mold, the raw material powder for the cylindrical member is filled and pressed to obtain a molded body, which is then sealed in a rubber bag or the like and subjected to hydrostatic pressure to obtain a dense molded body. The molded body is then fired. By these methods, the cylindrical member having the coil provided on the outer circumferential portion is obtained. Subsequently, a buffering member (ceramic fiber or glass fiber) is wound around the outer side of the cylindrical member having the coil provided on the outer circumferential portion, and a thin wall member made of a material such as ferrite is mechanically fixed to the outer side to form an electromagnetic shielding layer.

The step of housing the honeycomb structure in the cylindrical can body via the buffering member can be performed in the same manner as the step of housing the honeycomb structure in the cylindrical member via the buffering member of Embodiment 1 as described above.

The cylindrical can body 32 according to Embodiment 3 of the present invention and the induction heating catalyst device including the same are thus obtained.

Embodiment 4

Figure 4:
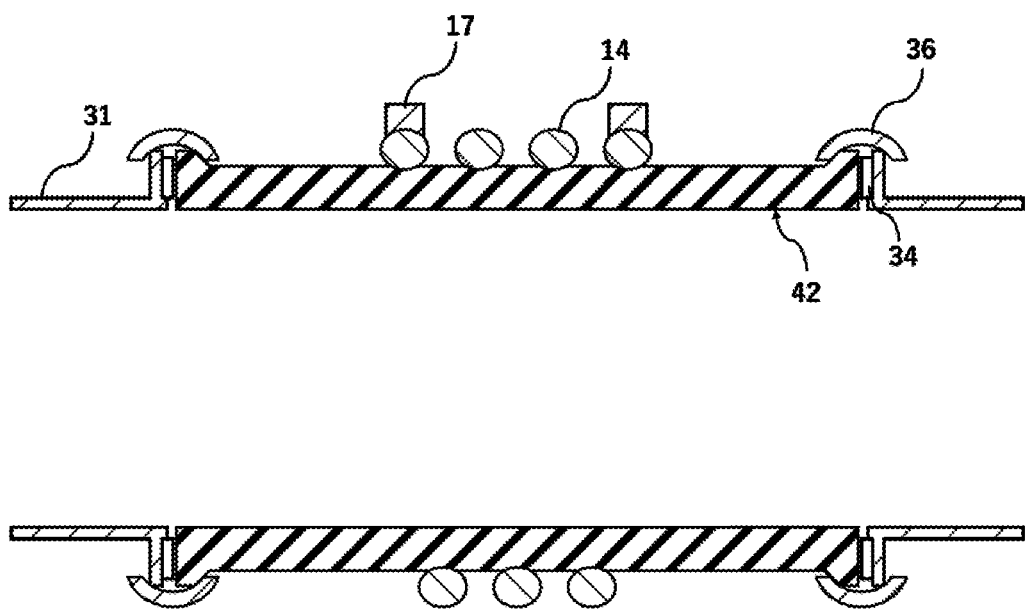
FIG. 4 is a schematic cross-sectional view of a cylindrical can body according to Embodiment 4 of the present invention, which is parallel to an axial direction.

FIG. 4 is a schematic cross-sectional view of a cylindrical can body 42 according to Embodiment 4 of the present invention, which is parallel to an axial direction. The cylindrical can body 42 according to Embodiment 4 of the present invention has the same structure as that of the cylindrical can body 32 according to Embodiment 3 as described above, with the exception that the buffering member 33 is not provided on the surface of the coil 14 and the electromagnetic shielding layer 21 is not provided.

The coil 14 of the cylindrical can body 42 is provided on the outer circumferential portion of the cylindrical can body 32 in the cross section parallel to the axial direction. That is, since the coil 14 is not exposed on an inner surface of the cylindrical can body 42 as with Embodiment 2, it has effects that the structure of the electrical wiring to be connected to the coil 14 for induction heating of the honeycomb structure can be simplified, and the insulation around the coil can be improved, and the like.

A method for producing the cylindrical can body 42 according to Embodiment 4 of the present invention and the induction heating catalyst device including the same can be carried out by the same procedure as that of the method for producing the cylindrical can body 32 according to the above Embodiment 3 and the induction heating catalyst device including the same, with the exception that Embodiment 4 does not provide the buffering member and the electromagnetic shielding layer, which are provided on the surface of the coil.

Embodiment 5

Figure 5:
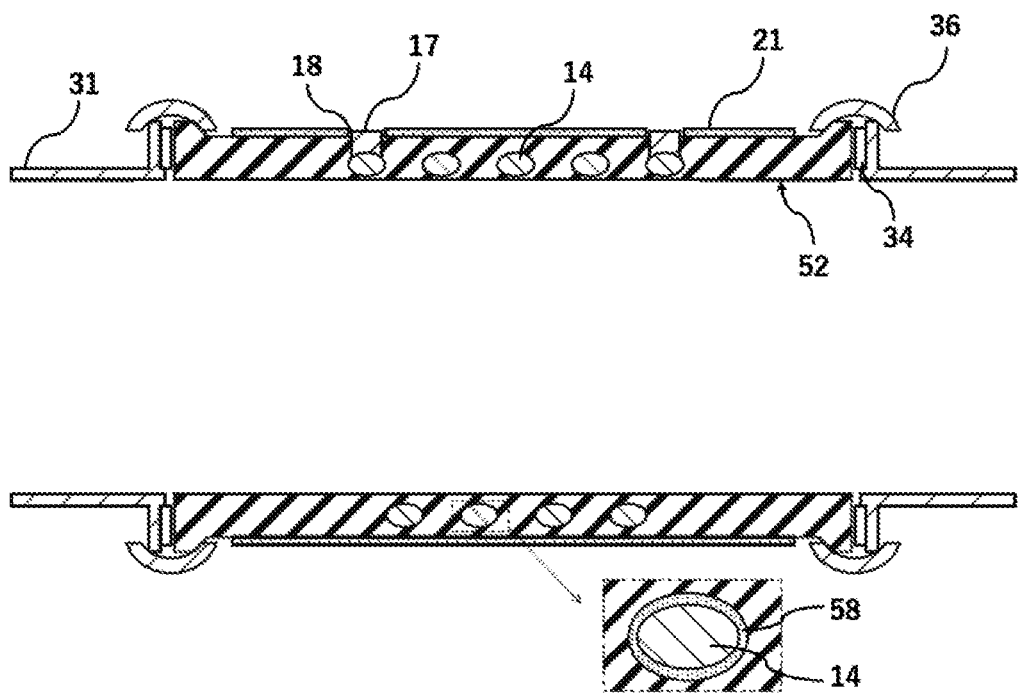
FIG. 5 is a schematic cross-sectional view of a cylindrical can body according to Embodiment 5 of the present invention, which is parallel to an axial direction.

FIG. 5 is a schematic cross-sectional view of a cylindrical can body 52 according to Embodiment 5 of the present invention, which is parallel to an axial direction. The cylindrical can body 52 is made of an insulating material and has the coil 14 for induction heating the honeycomb structure.

The coil 14 is provided radially outward from an inner circumferential surface of the cylindrical can body 52 in a cross section parallel to the axial direction of the cylindrical can body 52 made of an insulating material. Also, the coil 14 is embedded in the cross section of the cylindrical can body 52 made of the insulating material. It should be noted that FIG. 5 shows such a structure in which the coil 14 is embedded in the cross section of the cylindrical can body 52 made of the insulating material. In the present invention, the coil 14 is not limited to this structure, it may have a structure in which at least a part of the coil 14 is embedded in the cross section as long as the coil 14 is provided radially outward from the inner circumferential surface of the cylindrical can body 52 in the cross section parallel to the axial direction of the cylindrical can body 52 made of the insulating material. According to such a structure, as with Embodiment 1, the coil 14 is not exposed to the inner surface of the cylindrical can body 52, so that it has effects that the electrical wiring to be connected to the coil 14 for induction heating of the honeycomb structure can be simplified, and that the insulation around the coil 14 can be improved, and the like.

The surface of the coil 14 of the cylindrical can body 52 may be covered with a buffering layer 58. The coil 14 can be protected by the buffering layer 58 to suppress deterioration such as oxidation of the coil 14. The buffering layer 58 is not particularly limited, but it may be made of the same material as that of the buffering member 33, for example.

The cylindrical can body 52 has an electromagnetic shielding layer 21 located on an outer side of the coil 14 in the cross section parallel to the axial direction. Specifically, the electromagnetic shielding layer 21 is provided on the outer surface of the cylindrical can body 52. According to such a structure, electromagnetic waves generated by the coil 14 during induction heating can be blocked by the electromagnetic shielding layer 21.

A method for producing the cylindrical can body 52 according to Embodiment 5 of the present invention and an induction heating catalyst device including the same will be described below. The method for producing the cylindrical can body 52 according to Embodiment 5 of the present invention and the induction heating catalyst device including the same includes a step of preparing the honeycomb structure having a magnetic body; a step of producing a cylindrical can body having a coil embedded therein; and a step of housing the honeycomb structure in the cylindrical can body via a buffering member.

In the step of producing the cylindrical can body having the coil embedded therein, first, a coil made of copper or the like is prepared and provided so as to have a shape that surrounds an outer circumference of the honeycomb structure. The coil is then placed in a mold, and a slurry of an insulating material (a raw material for the cylindrical member) is poured into the mold and fired. The cylindrical member having the coil embedded therein is thus obtained. Further, the electromagnetic shielding layer is formed by providing a thin wall component prepared using ferrite or the like at a predetermined position on the outer circumference of the cylindrical member. Alternatively, the coil may be placed in the raw material powder without using the insulating material slurry, hydrostatically pressurized and then sintered to produce the cylindrical member. Hot press firing may be used as the firing method.

The step of housing the honeycomb structure in the cylindrical can body via the buffering member can be performed in the same manner as the step of housing the honeycomb structure in the cylindrical member via the buffering member of Embodiment 1 as described above.

As described above, the cylindrical can body 52 according to Embodiment 5 of the present invention and the induction heating catalyst device including the same are obtained.

Embodiment 6

Figure 6:
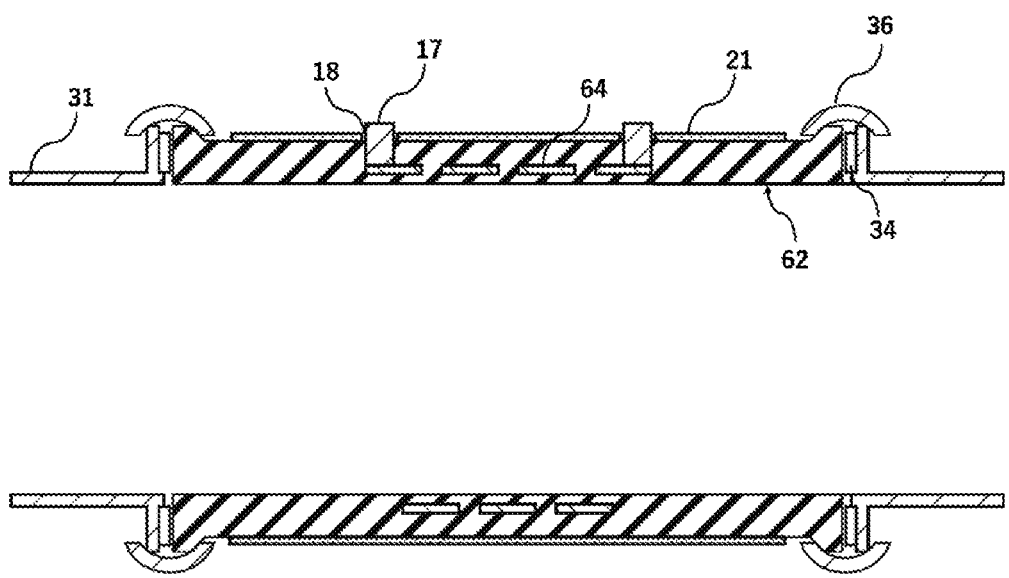
FIG. 6 is a schematic cross-sectional view of a cylindrical can body according to Embodiment 6 of the present invention, which is parallel to an axial direction.

FIG. 6 is a schematic cross-sectional view of a cylindrical can body 62 according to Embodiment 6 of the present invention, which is parallel to an axial direction. The cylindrical can body 62 according to Embodiment 6 has the same structure as that of the cylindrical can body 52 shown in Embodiment 5 as described above, with the exception that the cross-sectional shape of the coil 64 is substantially rectangular rather than elliptical. According to such a structure, as with Embodiment 1, since the coil 64 is not exposed to the inner surface of the cylindrical can body 62, it has effects that the electric wiring to be connected to the coil 64 for induction heating of the honeycomb structure can be simplified, and that the insulation around the coil can be improved.

A method for producing the cylindrical can body 62 according to Embodiment 6 of the present invention and the induction heating catalyst device including the same can be carried out by the same procedure as that of the method for producing the cylindrical can body 52 according to Embodiment 5 described above and the induction heating catalyst device including the same, with the exception that the cross-sectional shape of the coil is substantially rectangular.

Embodiment 7

Figure 7:
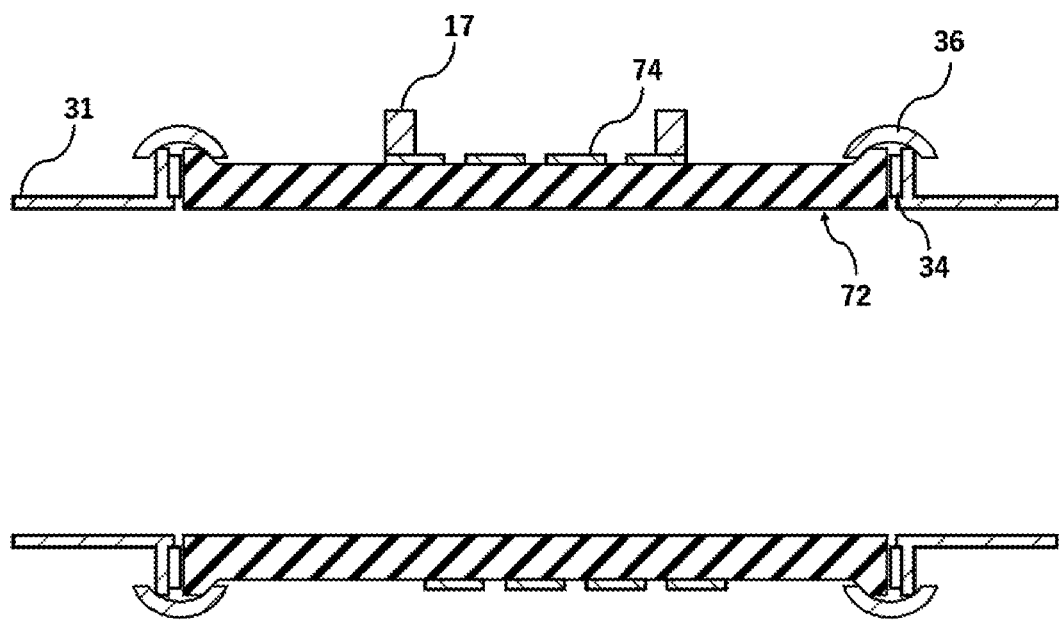
FIG. 7 is a schematic cross-sectional view of a cylindrical can body according to Embodiment 7 of the present invention, which is parallel to an axial direction.

FIG. 7 is a schematic cross-sectional view of a cylindrical can body 72 according to Embodiment 7 of the present invention, which is parallel to an axial direction. The cylindrical can body 72 according to Embodiment 7 has the same structure as that of the cylindrical can body 42 shown in Embodiment 4 as described above, with the exception that the cross-sectional shape of the coil 74 is substantially rectangular rather than elliptical. According to such a structure, as with Embodiment 1, since the coil 74 is not exposed to the inner surface of the cylindrical can body 72, it has effects that the electric wiring to be connected to the coil 74 for induction heating of the honeycomb structure can be simplified, and that the insulation around the coil can be improved, and the like.

A method for producing the cylindrical can body 72 according to Embodiment 7 of the present invention and the induction heating catalyst device including the same can be carried out by the same procedure as that of the method for producing the cylindrical can body 42 according to Embodiment 4 described above and the induction heating catalyst device including the same, with the exception that the cross-sectional shape of the coil is substantially rectangular.

Figure 8:
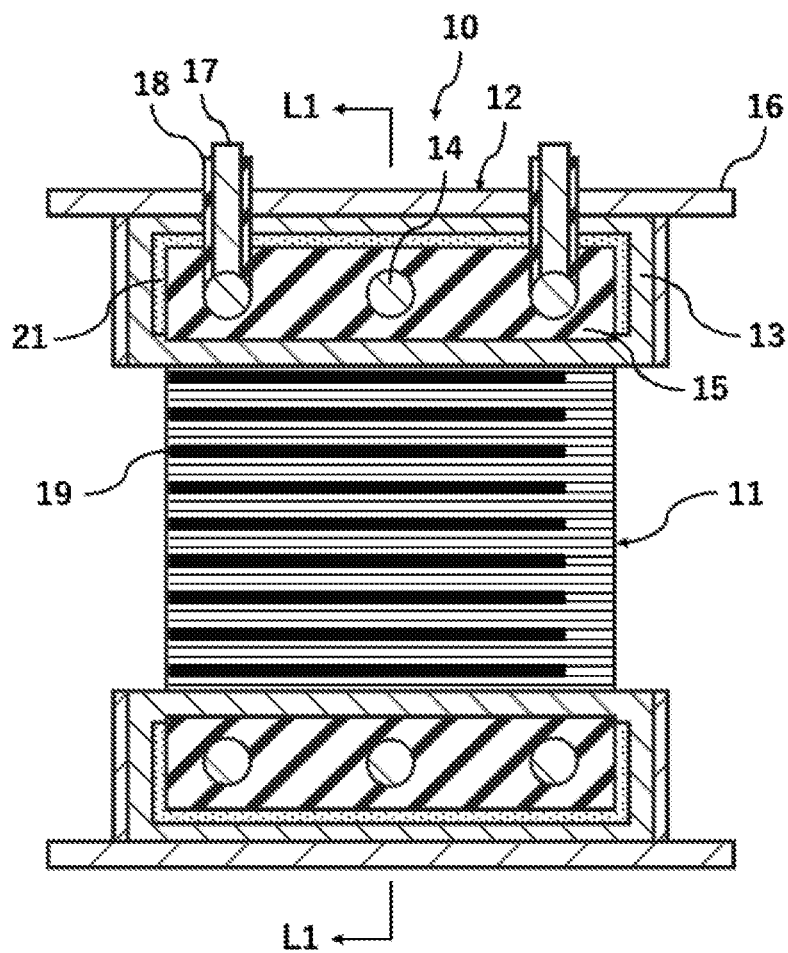
FIG. 8 is a schematic cross-sectional view of a cylindrical member of an induction heating catalyst device according to Embodiment 1 of the present invention, which is parallel to an axial direction.

The cylindrical can bodies 12, 22, 32, 42, 52, 62, 72 having the characteristics as described above can be used in induction heating catalyst devices, respectively. Here, as an example, FIG. 8 shows a schematic cross-sectional view of the cylindrical member 15 of the induction heating catalyst device 10 according to Embodiment 1 of the present invention, which is parallel to the axial direction. As shown in FIG. 8, the induction heating catalyst device 10 includes the cylindrical can body 12 and a honeycomb structure 11 housed in the cylindrical can body 12 via the buffering member 13.

The honeycomb structure 11 includes: an outer peripheral wall; a partition wall disposed on an inner side of the outer peripheral wall, the partition wall defining a plurality of cells, each of the cells penetrating from one end face to other end face to form a flow path.

Although materials of the partition wall and the outer peripheral wall of the honeycomb structure 11 are not particularly limited, the honeycomb structure 11 is typically formed of a ceramic material. Examples of the ceramic material include cordierite, silicon carbide, aluminum titanate, silicon nitride, mullite, alumina, a silicon-silicon carbide-based composite material, or silicon carbide-cordierite based composite material, in particular, a sintered body containing silicon-silicon carbide composite material or silicon carbide as a main component.

Preferably, the honeycomb structure 11 is formed of at least one ceramic material selected from the group consisting of cordierite, silicon carbide, aluminum titanate, silicon nitride, mullite, and alumina.

The shape of the cell of the honeycomb structure 11 may be, but not particularly limited to, a polygonal shape such as a triangle, a quadrangle, a pentagon, a hexagon and an octagon; a circular shape; an ellipse shape; or irregular shapes, in a cross section orthogonal to the central axis of the honeycomb structure 11. The shape of the cell is preferably the polygonal shape.

The partition wall of the honeycomb structure 11 preferably has a thickness of from 0.05 to 0.50 mm, and more preferably from 0.10 to 0.45 mm, in terms of ease of production. For example, the thickness of 0.05 mm or more improves the strength of the honeycomb structure 11. The thickness of 0.50 mm or less can result in lower pressure loss. It should be noted that the thickness of the partition wall is an average value measured by a method for observing the axial cross section with a microscope.

The partition wall preferably has a porosity of from 20 to 70%. The porosity of the partition wall is more preferably 20% or more, in terms of ease of production. The porosity of 70% or less can maintain the strength of the honeycomb structure 11.

The porous partition wall preferably has an average pore diameter of from 2 to 30 μm, and more preferably from 5 to 25 μm. The average pore diameter of 2 μm or more can result in ease of production, and the average pore diameter of 30 μm or less can maintain the strength of the honeycomb structure 11. As used herein, the terms "average pore diameter" and "porosity" mean an average pore diameter and porosity measured by the mercury intrusion technique.

The honeycomb structure 11 preferably has a cell density in a range of from 5 to 150 cells/cm$^2$, and more preferably 5 to 100 cells/cm$^2$, and even more preferably in a range of from 31 to 80 cells/cm$^2$, although not particularly limited thereto.

An outer shape of the honeycomb structure 11 may be a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like.

Such a honeycomb structure 11 is produced by forming a green body containing a ceramic raw material into a honeycomb shape having a partition wall that penetrates from one end face to other end face and define a plurality of cells to form flow paths for a fluid, to form a honeycomb formed body, and drying the honeycomb formed body and then firing it. When such a honeycomb structure is used as the honeycomb structure 11 according to the present embodiment, the outer peripheral wall may be integrally extruded with a honeycomb structure, which may be used as the outer peripheral wall as it is, or an outer circumference of the honeycomb structure may be ground and shaped into a predetermined shape after forming or firing it, and a coating material may be applied to the outer circumference-ground honeycomb structure to form an outer peripheral coating.

The honeycomb structure 11 is not limited to an integral type honeycomb structure 11 in which the partition wall is integrally formed. For example, the honeycomb structure 11 may be a honeycomb structure in which pillar shaped honeycomb segments each having a partition wall and a plurality of cells defined by the partition wall to form flow paths for a fluid are combined via joining material layers (joined honeycomb structure).

By supporting the catalyst on a surface of the partition wall of the honeycomb structure 11, it may be used as a catalyst support. The catalyst may employ at least one selected from the group consisting of an oxidation catalyst, a three-way catalyst, a NOx storage reduction catalyst, a NOx selective reduction catalyst (SCR catalyst), a hydrocarbon adsorption catalyst, hydrocarbon, a carbon monoxide oxidation catalyst, and an ammonia slip (oxidation) catalyst.

The catalyst can be appropriately selected depending on the desired purpose of exhaust gas purification. The method for supporting the catalyst is not particularly limited, and it can be carried out according to a conventional method for supporting a catalyst on a honeycomb structure.

The interior of the honeycomb structure 11 may be provided with magnetic bodies 19. The magnetic bodies 19 may be filled in the cells of the honeycomb structure 11. Each magnetic body 19 can be plate-shaped, rod-shaped, ring-shaped, wire-shaped, or fiber-shaped, for example. In the present invention, rod-shaped magnetic bodies and wire-shaped magnetic bodies are distinguished from each other by defining those having a cross-sectional diameter of 0.8 mm or more perpendicular to the length direction as the rod-shaped magnetic bodies, and defining those having a diameter of less than 0.8 mm as the wire-shaped magnetic bodies. When the magnetic bodies 19 are filled in the cells, the magnetic bodies 19 having those shapes can be appropriately used according to the shape of the cell. A single cell may be filled with a plurality of magnetic bodies 19 or may be filled with only one magnetic body 19. The magnetic bodies 19 may be contained in a surface layer provided on the partition wall of the honeycomb structure 11. The surface layer contains a fixing material in which powder of the magnetic body 19 is dispersed. Examples of the fixing material that can be used herein include glass containing a silicate, borate or borosilicate, crystallized glass, ceramics, or glass, crystallized glass, ceramics, containing other oxides, or the like.

Types of the magnetic body 19 include, for example, balance Co-20% by mass of Fe; balance Co-25% by mass of Ni-4% by mass of Fe; balance Fe-15 to 35% by mass of Co; balance Fe-17% by mass of Co-2% by mass of Cr-1% by mass of Mo; balance Fe-49% by mass of Co-2% by mass of V; balance Fe-18% by mass of Co-10% by mass of Cr-2% by mass of Mo-1% by mass of A; balance Fe-27% by mass of Co-1% by mass of Nb; balance Fe-20% by mass of Co-1% by mass of Cr-2% by mass of V; balance Fe-35% by mass of Co-1% by mass of Cr; pure cobalt; pure iron; electromagnetic soft iron; balance Fe-0.1 to 0.5% by mass of Mn; balance Fe-3% by mass of Si; balance Fe-6.5% by mass of Si; balance Fe-18% by mass of Cr; balance Fe-16% by mass of Cr-8% by mass of Al; balance Ni-13% by mass of Fe-5.3% by mass of Mo; balance Fe-45% by mass of Ni; balance Fe-10% by mass of Si-5% by mass of Al; balance Fe-36% by mass of Ni; balance Fe-45% by mass of Ni; balance Fe-35% by mass of Cr; balance Fe-13% by mass of Cr-2% by mass of Si; balance Fe-20% by mass of Cr-2% by mass of Si-2% by mass of Mo; balance Fe-20% by mass of Co-1% by mass of V; balance Fe-13% by mass of Cr-2% by mass of Si; balance Fe-17% by mass of Co-2% by mass of Cr-1% by mass of Mo; and the like.

A method for producing the honeycomb structure including the magnetic bodies is carried out by, first, preparing a honeycomb fired body having a ceramic partition wall and a plurality of cells defined by the partition wall, and providing the honeycomb fired body with the magnetic bodies. The ceramic honeycomb fired body can be produced by a known method.

The honeycomb fired body is then provided with the magnetic bodies. When the magnetic body is magnetic powder contained in the surface layer and the surface layer is provided on the partition wall of the cells, first, a surface layer forming slurry is prepared from a material obtained by mixing the magnetic powder with the fixing material made of glass or the like. More particularly, for example, magnetic powder and glass powder are blended, and a binder, dispersant, and water are blended therein to prepare the surface layer forming slurry. The blending ratio of the magnetic powder to the glass powder is 1:1 or more and 20:1 or less on a volume basis.

Subsequently, a mask is applied onto some of the cells on one end face on an upstream side of the honeycomb dried body, and that end face is immersed in a storage container in which the surface layer forming slurry is stored to coat the non-masked cells with the surface layer forming slurry. In this case, the surface layer forming slurry is applied to the interior of the cells in a region of a predetermined length from one end face of the honeycomb fired body. It is then dried to remove water in the surface layer forming slurry, thereby forming a surface layer on the partition wall of the cells. As the drying conditions, the same conditions as those for drying the honeycomb formed body can be used. A heat treatment is then performed to bond the magnetic bodies together and to fix the magnetic bodies to the partition wall of the honeycomb fired body by means of a glass phase. The heat treatment can be performed at a temperature of 800° C. to 1300° C. for 0.5 hour to 2 hours.

A method of filling the slurry in the cells is simply carried out by pushing a paste-like material into the cells with a spatula such as a squeegee. It is easy to control the depth by the number of squeegee processes to be pushed. A method of preparing a slurry having good fluidity and coating the partition wall surface of the honeycomb fired body with the slurry by a suction method to form the surface layer may be employed.

Further, when the magnetic body is a magnetic powder and is filled in the cells in a state of being contained in a binding material or an adhesive material, first, a slurry including the magnetic powder and the binder containing metal or glass as a main component is poured into the cells of the honeycomb fired body and solidified by heating it at a temperature equal to or higher than a melting point of the metal or a softening point of the glass. Alternatively, a slurry including magnetic powder and an adhesive material containing silica or alumina as a main component is poured into the cells of the honeycomb fired body and heated to solidify the silica or alumina.

When using the binding material containing metal or glass as a main component, it is necessary to melt or soften the honeycomb fired body once at a temperature lower than a heat resistance temperature of the honeycomb fired body, and so it is preferable to heat it at a temperature higher than or equal to a melting point or a softening point of the binding material. Also, depending on use environments, the maximum temperature may reach about 700° C., and so it is more preferable to use a metal or glass having a melting point or softening point higher than or equal to that temperature. A specific melting point or softening point is, for example, 800 to 1200° C. On the other hand, when using the adhesive material containing silica or alumina as a main component, it is preferable that the adhesive material can be solidified by heating and drying during production. The adhesive material that can be solidified by heating and drying includes, for example, a colloidal dispersion of silica or alumina, or may be a colloidal dispersion containing silica and alumina. Further, since the maximum temperature in the usage environment reaches about 700° C., it is more preferable to use silica or alumina having a heat resistance temperature higher than or equal to that temperature. After the slurry is poured into the cells of the honeycomb fired body, a suction jig is attached to a downstream side of the honeycomb fired body, the excess water is removed by suction from the other end face side downstream of the honeycomb fired body, and the material containing the magnetic bodies is filled. As for the conditions for the heat treatment of the material containing the magnetic bodies, it is preferable to heat the material at a temperature of 800 to 1200° C. for 0.5 to 3 hours.

When using the adhesive material containing alumina or silica as a main component, the step of pouring the slurry into the cells may be performed at the stage of the honeycomb formed body or the honeycomb dried body. In this case, after the slurry is poured into the cells of the honeycomb formed body, the honeycomb formed body is dried, and in the step of firing the honeycomb dried body, the step of fixing the magnetic bodies to the adhesive material is simultaneously performed. The silica or alumina preferably exerts the effect of being solidified by drying.

When the magnetic body has a plate shape, rod shape, ring shape, wire shape, or fiber shape and is filled in the cells, first, a magnetic body having a predetermined plate shape, rod shape, wire shape or fiber shape is prepared in consideration of the cross-sectional shape of the cells of the honeycomb fired body to be filled with the magnetic body and the length of the cells. The cells are then filled with the magnetic bodies by inserting the magnetic bodies into the predetermined cells of the honeycomb fired body from the end face on the upstream side to a predetermined length. When the magnetic body is ring-shaped, the end face on the upstream side of the honeycomb fired body is cut to a predetermined depth to form grooves, and the ring-shaped magnetic bodies are inserted into the grooves. Alternatively, a raw honeycomb formed body having grooves formed is prepared and dried to produce a honeycomb dried body, and the ring-shaped magnetic bodies are then inserted into the grooves.

After providing the magnetic bodies, a catalyst support can be produced by supporting a catalyst in predetermined cells of the honeycomb fired body. The method for supporting the catalyst is not particularly limited, and it may be carried out according to the method for supporting the catalyst carried out in the conventional method for producing the catalyst support.

DESCRIPTION OF REFERENCE NUMERALS 10 induction heating catalyst device
11 honeycomb structure
12, 22, 32, 42, 52, 62, 72 cylindrical can body
13, 23, 33 buffering member
14, 64, 74 coil 15, 25 cylindrical member
16 metal member
17 electrical connection terminal
18 insulating material
19 magnetic body
21 electromagnetic shielding layer
31 metal exhaust pipe
34 gasket
36 fixing member
58 buffering layer The inevntion claimed is:

1. A cylindrical can body capable of housing a honeycomb structure therein, the cylindrical can body comprising:
   a coil for induction-heating the honeycomb structure;
   a cylindrical member made of an insulating material; and
   a cylindrical metal member capable of housing the coil and the cylindrical member therein,
   wherein, in a cross section parallel to an axial direction of the cylindrical member,
   (i) the coil is provided radially outward from an inner circumferential surface of the cylindrical member, and at least a part of the coil is embedded in the cross section of the cylindrical member; or
   (ii) the coil is provided on an outer circumferential portion of the cylindrical member,
   wherein the insulating material comprises any one of silicon nitride, sialon, silicon carbide, cordierite, zirconia and mullite as a main component, or a composite material thereof as a main component, and
   wherein the cylindrical member has a thickness of 10 to 30 mm.

2. The cylindrical can body according to claim 1, further comprising an electromagnetic shielding layer between the coil and the cylindrical metal member in the cross section parallel to the axial direction of the cylindrical can body.

3. The cylindrical can body according to claim 1, wherein the insulating material is a mullite fiber reinforced material.

4. The cylindrical can body according to claim 1, further comprising a pillar shaped honeycomb structure, wherein the pillar shaped honeycomb structure comprises: an outer peripheral wall; a partition wall disposed on an inner side of the outer peripheral wall, the partition wall defining a plurality of cells, each of the cells penetrating from one end face to other end face to form a flow path; and magnetic bodies.

5. A cylindrical can body capable of housing a honeycomb structure therein,
   wherein the cylindrical can body comprises a coil for induction-heating the honeycomb structure;
   wherein the cylindrical can body is made of an insulating material;
   wherein, in a cross section parallel to an axial direction of the cylindrical can body,
   (i) the coil is provided radially outward from an inner circumferential surface of the cylindrical can body, and at least a part of the coil is embedded in the cross section of the cylindrical can body; or
   (ii) the coil is provided on an outer circumferential portion of the cylindrical can body, and
   wherein the insulating material comprises any one of silicon nitride, sialon, silicon carbide, cordierite, zirconia and mullite as a main component, or a composite material thereof as a main component.

6. The cylindrical can body according to claim 5, wherein the coil is provided radially outward from the inner circumferential surface of the cylindrical can body via a buffering layer in the cross section parallel to the axial direction of the cylindrical can body, and at least a part of the coil is embedded in the cross section of the cylindrical can body.

7. The cylindrical can body according to claim 5, wherein the coil is provided on an outer circumferential portion of the cylindrical can body in the cross section parallel to the axial direction of the cylindrical can body, and a surface of the coil is held by a buffering material.

8. The cylindrical can body according to claim 5, further comprising an electromagnetic shielding layer located on a radially outer side of the coil in the cross section parallel to the axial direction of the cylindrical can body.

9. An induction heating catalyst device comprising: the cylindrical can body according to claim 1; and a honeycomb structure having magnetic bodies housed inside the cylindrical can body via a buffering member.

* * * * *